United States Patent
Kaji et al.

[19]

[11] Patent Number: 5,920,044
[45] Date of Patent: *Jul. 6, 1999

[54] PRESSURE-RESPONSIVE SWITCH

[75] Inventors: Tetsuya Kaji; Norihisa Kurihara, both of Yokohama, Japan

[73] Assignees: Asmo Co., Ltd., Shizuoka-ken, Japan; Bridgestone Corporation, Tokyo, Japan

[ * ] Notice: This patent issued on a continued prosecution application filed under 37 CFR 1.53(d), and is subject to the twenty year patent term provisions of 35 U.S.C. 154(a)(2).
This patent issued on a continued prosecution application filed under 37 CFR 1.53(d), and is subject to the twenty year patent term provisions of 35 U.S.C. 154(a)(2).
This patent is subject to a terminal disclaimer.

[21] Appl. No.: 08/724,218

[22] Filed: Oct. 1, 1996

[30] Foreign Application Priority Data

Oct. 5, 1995 [JP] Japan .................................. 7-259062

[51] Int. Cl.⁶ ...................................................... H01H 3/16
[52] U.S. Cl. ......................................................... 200/61.44
[58] Field of Search .............................. 200/61.62, 61.43, 200/61.44

[56] References Cited

U.S. PATENT DOCUMENTS

| | | | |
|---|---|---|---|
| 3,710,050 | 1/1973 | Richards | 200/61.43 |
| 4,532,388 | 7/1985 | Sackmann et al. | 200/61.43 |
| 5,023,418 | 6/1991 | Beckhausen | 200/511 |
| 5,072,080 | 12/1991 | Beckhausen | 200/61.43 |
| 5,296,658 | 3/1994 | Kramer et al. | 200/61.43 |
| 5,481,076 | 1/1996 | Mullet et al. | 200/61.43 |

FOREIGN PATENT DOCUMENTS

| | | |
|---|---|---|
| 353 332 B1 | 2/1990 | European Pat. Off. . |
| 0 405 351 A1 | 1/1991 | European Pat. Off. . |
| 0654575 | 5/1995 | European Pat. Off. . |
| 32 32 365 | 3/1984 | Germany . |
| 34 27 771 | 2/1986 | Germany . |
| 7-7035 | 1/1995 | Japan . |

*Primary Examiner*—Wynn Wood Coggins
*Assistant Examiner*—Michael J. Hayes
*Attorney, Agent, or Firm*—Oliff & Berridge PLC

[57] ABSTRACT

A pressure responsive switch includes a flexible hollow cord member which includes a predetermined wall portion and an opposing portion which generally opposes the predetermined wall portion. In a transverse cross section of the hollow cord member, a neutral axis of the cord switch is located to the predetermined wall portion side from the center of the distance between the predetermined wall portion and the opposing portion. A contact portion is disposed inwardly of the hollow cord member and extends on a portion of the predetermined wall portion along the longitudinal direction of the hollow cord member. A contact body is disposed apart from the contact portion and extends along the longitudinal direction of the hollow cord member, the contact body being disposed inwardly of the hollow cord member and extending from the opposing portion to portions between the predetermined wall portion and the opposing portion in the hollow cord member, as viewed from a transverse cross section of the hollow cord member.

10 Claims, 7 Drawing Sheets

PRESSURE-RESPONSIVE SWITCH

BACKGROUND OF THE INVENTION

1. Field of the Invention

The present invention relates to a cord switch which is switched over when a cord member of the cord switch is pressed.

2. Description of the Related Art

Considering the safety for the user of the vehicle, a window regulator which is driven by a motor to raise and lower a glass of a vehicle door, for example, has been provided in which a cord switch is mounted on a window frame of the vehicle door, and when any obstacle (or foreign object) has been jammed between the cord switch and the glass of the vehicle door, the cord switch is pressed and switched over, so that rotation of the motor is stopped or reversed.

Figure 14:
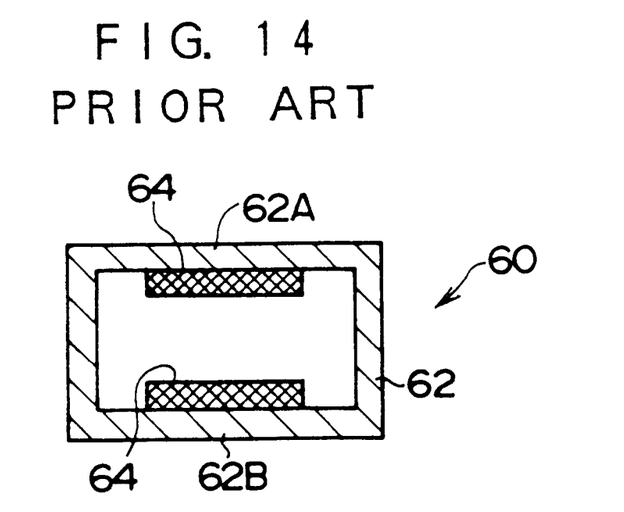
FIG. 14 is a cross sectional view of a conventional cord switch.

As shown in FIG. 14, a cord switch 60 has a hollow flexible cord member 62 such as a silicone, a rubber or the like in which the cord member 62 is provided with contact lines 64 at an upper wall portion 62A (which corresponds to one of two wall portions of the cord member 62 generally opposed to each other) and at a lower wall portion 62B (which corresponds to the other of the two wall portions), respectively. When the cord member 62 is pressed, these contact lines 64 are made contact each other.

However, when the cord switch 60 is mounted on the window frame of the vehicle door, it may be bent largely at the corner of the window frame. Therefore, the contact lines 64 may be made to contact each other when the cord switch 60 is mounted on the window frame.

Figure 15:
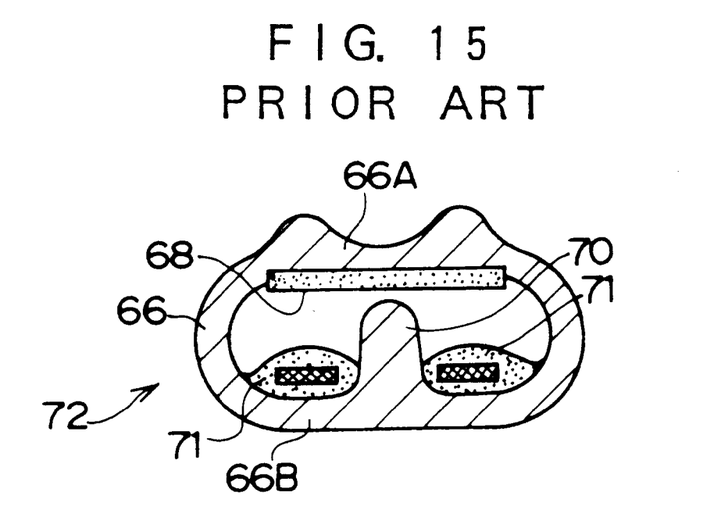
FIG. 15 is a cross sectional view of a conventional cord switch.

Therefore, in a cord switch 72 shown in FIG. 15, a bridge conductor 68 is disposed at an upper wall portion 66A of a cord member 66 and two contact lines 71 are disposed at a lower wall portion 66B of the cord member 66 with a barrier wall 70 being interposed between these contact lines 71 (see Japanese Utility Model Application) No. 5-41282).

The cord switch 72 is structured such that even when a bending force is applied to the cord switch 72, because the distal end portion of the barrier wall 70 abuts on the bridge conductor 68, the bridge conductor 68 and the contact lines 71 are not made to contact each other unnecessarily.

However, unless a pressing force which acts on the cord member 66 is strong enough to deform the barrier wall 70, the bridge conductor 68 does not contact these contact lines 71. Further, when the pressing force acts on the barrier wall 70 vertically, the bridge conductor 68 is pressed in parallel to the barrier wall 70 and does contact the contact lines 71. However, if the pressing force acts on the barrier wall 70 from a transverse or diagonal direction, the barrier wall 70 is not deformed but is inclined due to the pressing force, and the bridge conductor 68 is pressed diagonally, so that the bridge conductor 68 does not contact any of the contact lines 71.

In view of the aforementioned facts, it is an object of the present invention to provide a pressure-responsive safety cord switch in which the desired bendability of the cord switch is accomplished, a contact portion and a contact body are not made to contact each other even when the cord switch is bent or flexed, but the contact portion and the contact body are made to contact each other even when a pressing force which acts on the cord switch is relatively small, and the contact portion and the contact body are made to contact each other, regardless of the angle at which the cord switch is pressed.

SUMMARY OF THE INVENTION

In accordance with an embodiment of the present invention, a pressure-responsive safety cord switch comprises a flexible hollow cord member which includes a predetermined wall portion and an opposing portion which generally opposes the predetermined wall portion and has a transverse cross sectional configuration, wherein a neutral axis of the cord switch is located to the predetermined wall portion side from the center of the distance between the predetermined wall portion and the opposing portion, a contact portion which is disposed inwardly of the hollow cord member and which extends on a portion of the predetermined wall portion along the longitudinal direction of the hollow cord member, and a contact body which is disposed apart from the contact portion and extends along the longitudinal direction of the hollow cord member, the contact body being disposed inwardly of the hollow cord member and extending from the opposing portion to portions between the predetermined wall portion and the opposing portion in the hollow cord member as viewed from a transverse cross section of the hollow cord member.

Namely, the cord switch according to the above embodiment of the present invention is characterized in that the cord switch has a cross sectional configuration of the flexible hollow cord member, wherein the neutral axis of the cord switch is located to the predetermined wall portion side from the center of the distance between the predetermined wall portion and the opposing portion which generally opposes to the predetermined wall portion.

For example, when the cord switch according to the first aspect is mounted along an inner peripheral portion of a window frame of a vehicle door through the predetermined wall portion of the cord member, a portion of the cord switch which is positioned at the corner portion of the window frame is bent such that a tensile stress is applied to the predetermined wall portion of the cord member and a compression stress is applied to the opposing portion thereof. However, the cord switch is more bendable at the opposing portion of the cord member because the distance between the opposing portion and the neutral axis is longer than that between the neutral axis and the predetermined wall portion, so that the mounting of the cord switch on the corner portion of the window frame or the like of the vehicle can be facilitated. Therefore, even at the corner portion of the window frame, the cross sectional configuration of the opposing portion of the cord member before the cord switch is bent can be maintained, and unless the opposing portion of the cord member is pressed inwardly of the cord switch, an unnecessary contact between the contact portion and the contact body can be prevented.

Further, positioning the neutral axis at the predetermined wall portion side can be accomplished by inclining the side wall portions of the cord member positioned between the predetermined wall portion and the opposing portion so as to approach each other toward the opposing portion. The cross sectional configuration of the cord member may have a generally trapezoidal, a generally semi-circular or a generally triangular configuration. For example, if the cross sectional configuration of the cord member is generally trapezoidal, the predetermined wall portion is a wall portion which corresponds to a bottom side of the trapezoid. If the cross sectional configuration of the cord member is generally semi-circular, the predetermined wall portion is a wall portion which corresponds to a chord portion of the semi-circle and the opposing portion of the cord member is a wall portion which corresponds to a substantially center point (i.e., central portion) of an arc of the semi-circle. Further, if the cross sectional configuration of the cord member is generally triangular, the predetermined wall portion is a wall portion which corresponds to one of the three sides of the triangle and the opposing portion is a wall portion which corresponds to a vertex of the triangle.

The contact body is disposed so as to cover the contact portion by extending from both of the side wall portions to the opposing portion in the cord member. Therefore, regardless of the angle at which the cord switch according to the first aspect is pressed, the contact body and the contact portion necessarily contact each other, so that very reliable switching-over of the cord switch can be effected in the cord switch.

In accordance with another embodiment of the present invention, a cord switch is provided in which at least one of the contact portion and the contact body is made of a conductive rubber or a conductive rubber in which a wire is embedded. For this reason, the contact portion and contact body can be deformed easily in conformity with deformation or bending of the cord switch. As a result, the cord switch itself according to the second aspect of the present invention can be deformed or bent easily.

In accordance with a further embodiment of the present invention, a cord switch is provided in which one of the cord switch and a member on which the cord switch is mounted has a projecting portion and the other of the cord switch and the member has a recessed portion into which the projecting portion is press-fitted. For this reason, the projecting portion is press-fitted into the recessed portion by merely pressing the cord switch. Further, the projecting portion may be a convex line which extends along the longitudinal direction of the one of the cord switch and the member on which the cord switch is mounted, while the recessed portion may be a groove which extends along the longitudinal direction of the other of the cord switch and the member on which the cord switch is mounted. Moreover, the projecting portion or the recessed portion is provided at the predetermined wall portion.

In accordance with an additional embodiment of the present invention, a cord switch is mounted by means of adhesion, embedding or press-fitting on a member on which the cord switch is mounted along the inner periphery of a window frame for a window glass which can be raised and lowered. In this case, when any obstacle has been jammed between the glass and the cord switch, the contact body contacts the contact potion and switching-over of the cord switch is conducted. As a result, it is sensed that the glass has struck any obstacle.

DESCRIPTION OF THE PREFERRED EMBODIMENT

Figure 1:
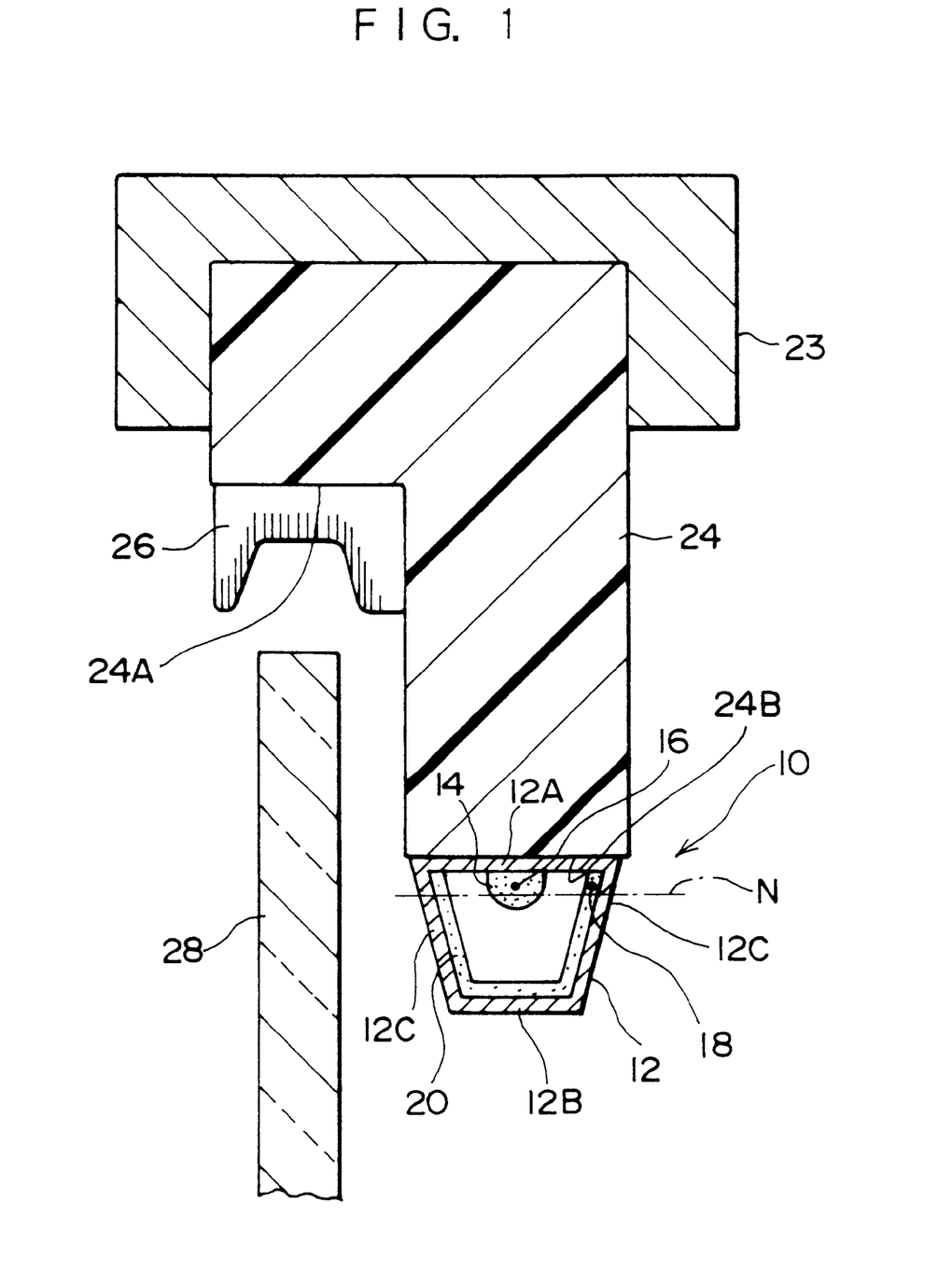
FIG. 1 is a cross sectional view illustrating a state in which a cord switch according to a first embodiment of the present invention is mounted.

As shown in FIG. 1, a cord switch 10 according to a first embodiment of the present invention has a flexible hollow cord member 12. The cord member 12 has a trapezoidal cross sectional configuration. In this way, since the cord member 12 has a trapezoidal cross sectional configuration, a neutral axis N of the cord member 12 is positioned at an upper wall portion 12A side of the center of the distance between the upper wall portion 12A and the lower wall portion 12B, so that the cord member 12 is more bendable at the lower wall portion 12B thereof than it is at the upper wall portion 12A thereof, and the mounting of the cord member 12 on a window frame 23 of a vehicle can be facilitated. Further, even when a tensile force is applied to the upper wall portion 12A and a compression force is applied to the lower wall portion 12B, namely, the cord member 12 is bent such that the lower wall portion 12B is positioned inwardly, a substantially original cross sectional configuration of the cord member 12 is maintained at the lower wall portion 12B thereof, so that an oversensitive contact between the upper wall portion 12A and the lower wall portion 12B is prevented, that is, a malfunction of the cord switch is prevented. In addition, the upper wall portion 12A corresponds to one of the two wall portions which substantially oppose to each other, of the cord member 12. On the other hand, the lower wall portion 12B, that is, the opposing portion described in the above aspects, corresponds to the other of the two wall portions.

On the other hand, at a substantially central portion of the upper wall portion 12A, a conductive rubber 14 constituting a contact portion is provided to extend along the longitudinal direction of the cord member 12. In this way, when the conductive rubber 14 serving as a contact portion is used, the whole body of the cord switch 10 becomes more bendable than the body of a cord switch in which only metal conductive lines are used. Moreover, the conductive rubber 14 has a wire 16 which is embedded at the core portion thereof and decreases the electrical resistance of the conductive rubber 14.

Meanwhile, a conductive rubber 20 in which a wire 18 is embedded is disposed in the cord member 12 so as to extend from side wall portions 12C of the cord member 12 which are substantially opposed to each other to the lower wall portion 12B in a generally U-shaped configuration. The wire 18 is preferably positioned at one end portion of the contact body formed by the conductive rubber 20, and is embedded in the conductive rubber 20 so as to not be exposed.

Next, a description of a state in which the cord switch 10 according to the present embodiment is mounted on a window frame of a vehicle door will be given in detail hereinafter.

Figure 6:
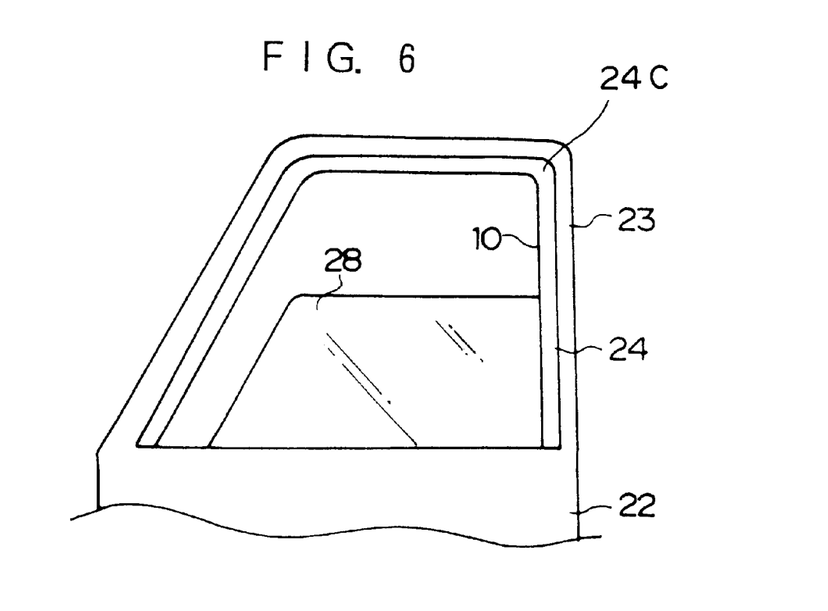
FIG. 6 is a side view of a window frame of a door of a vehicle on which the cord switch according to the first embodiment of the present invention is mounted.

As shown in FIG. 6, a weather strip 24 is mounted on the generally rectangular window frame 23 of the vehicle door to be bent along an inner peripheral wall thereof. As shown in FIG. 1, the weather strip 24 has a cross section of a generally L-shaped configuration. A glass sealing member 26 is attached to a step portion 24A of the weather strip 24. An outer edge of the raised door glass 28 is fitted into the glass sealing member 26 to close the opening of the window frame 23.

Further, the upper wall portion 12A of the cord member 12 is adhered to the lower edge portion 24B of the weather strip 24 and the cord switch 10 is disposed at a position slightly shifted from the moving track of the door glass 28. For this reason, even when the door window is closed fully by the window glass 28, the cord switch 10 is not pressed by the door glass 28 and is not switched over, accordingly. Therefore, it becomes unnecessary to dispose a limit switch or the like for detecting the position of the door glass to determine whether the opening of the door window has been fully closed by the door glass 28 or any obstacle has been jammed between the door glass and the window frame 23. As a result, a jam preventing mechanism is simplified and the control circuitry for the mechanism can also be simplified.

Further, even when the cord switch 10 is bent at a corner portion 24C of the weather strip 24, the cord switch 10 is more bendable at the lower wall portion 12B of the cord member 12 than at the upper wall portion 12A thereof, so that the cord switch 10 can substantially maintain the cross sectional configuration thereof before the bending of the cord switch 10. Accordingly, the distance between the conductive rubber 14 and the conductive rubber 20 is maintained substantially constant before and after the bending of the cord switch 10. As a result, an unnecessary contact between the conductive rubber 14 and the conductive rubber 20 can be prevented.

When any obstacle has been jammed, or clamped, between the door glass 28 and the cord switch 10, the lower wall portion 12B is pressed upwardly, and the conductive rubber 14 and the conductive rubber 20 are made to contact each other. Therefore, the cord switch 10 is switched over, for example, from ON to OFF switching-over, or from OFF to ON switching-over, so as to stop or reverse (i.e., inversely lower the window glass 28) an elevating apparatus (i.e., window regulator) which is not shown. Further, the sensitivity adjustment of the cord switch 10 can be effected easily by changing the thicknesses of the cord member and the conductive rubber, and the distance between the conductive rubbers.

Figure 2:
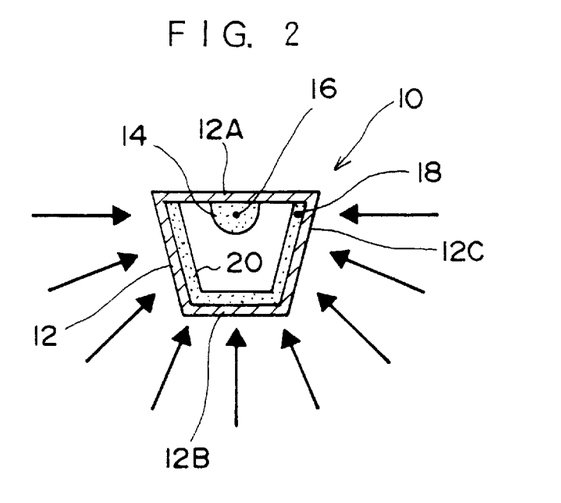
FIG. 2 is a cross sectional view of the cord switch according to the first embodiment of the present invention.

As shown in FIG. 2, regardless of the angle at which the cord switch 10 is pressed, very reliable switching-over can be effected in the cord switch 10.

Figure 3:
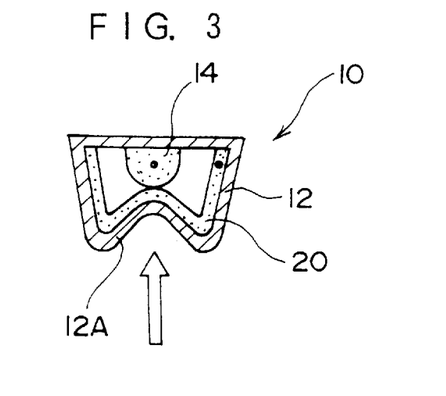
FIG. 3 is a cross sectional view illustrating a state in which a pressing force acts on the cord switch from directly beneath the cord switch according to the first embodiment of the present invention.
Figure 4:
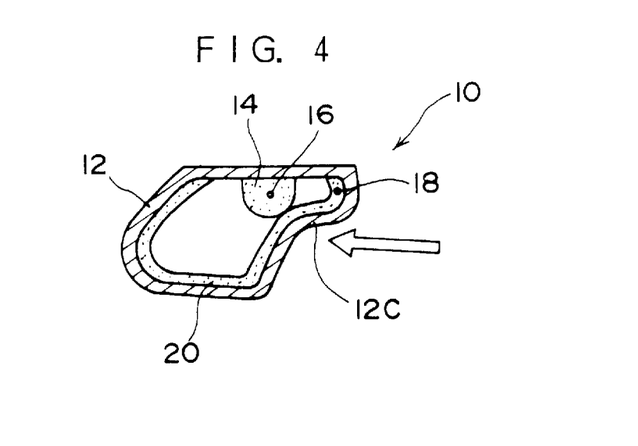
FIG. 4 is a cross sectional view illustrating a state in which a pressing force from a directly transverse direction acts on the cord switch according to the first embodiment of the present invention.
Figure 5:
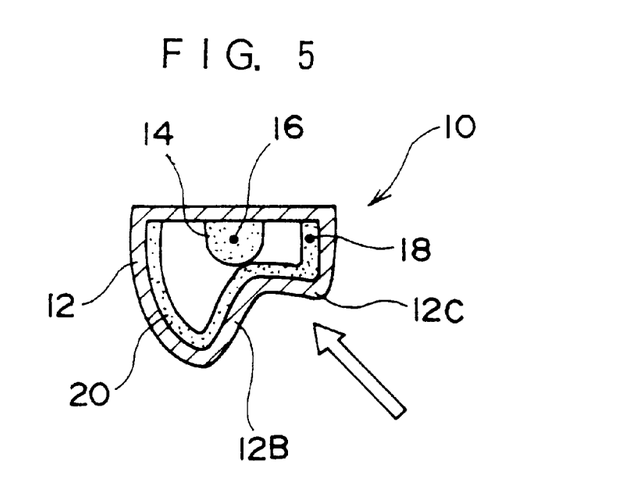
FIG. 5 is a cross sectional view illustrating a state in which a pressing force from a diagonally downward direction acts on the cord switch according to the first embodiment of the present invention.

As shown in FIG. 3, when a pressing force acts on the cord switch 10 upwardly, the lower wall portion 12B of the cord member 12 is deformed to protrude upwardly, so that the conductive rubber 14 and the conductive rubber 20 are made to contact each other. As shown in FIG. 4, when a pressing force from a directly transverse direction acts on the cord switch 10, one of the side wall portions 12C of the cord member 12 is deformed to make the conductive rubber 14 and the conductive rubber 20 contact each other. Further, as shown in FIG. 5, when a pressing force acts on the cord switch 10 diagonally, one of the sidewall portions 12C and the lower wall portion 12B are deformed to make the conductive rubber 14 and the conductive rubber 20 contact each other.

Figure 7:
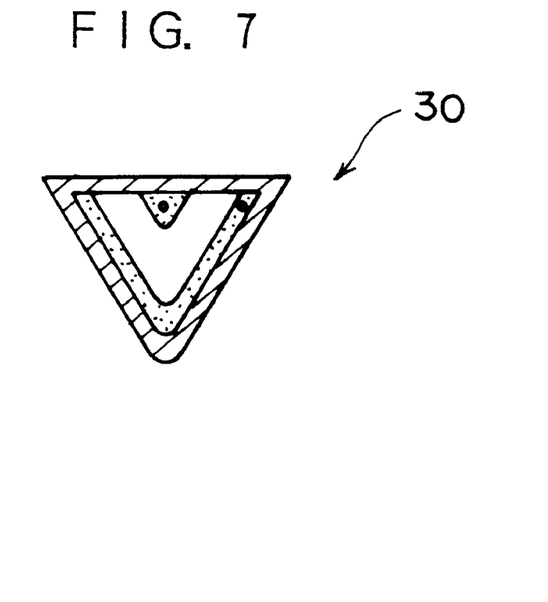
FIG. 7 is a cross sectional view of a cord switch according to a second embodiment of the present invention.
Figure 8:
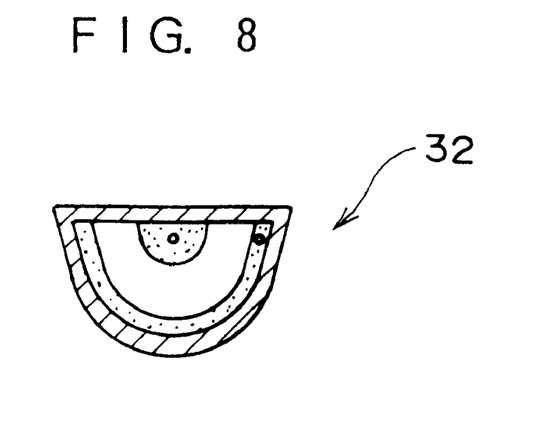
FIG. 8 is a cross sectional view of a cord switch according to a third embodiment of the present invention.

It should be noted that the cross sectional configuration of the cord member 12 is not limited to a trapezoidal configuration. In order to position a neutral axis of the cord member at the upper wall portion side of the center of the distance between the upper wall portion and the lower wall portion, a triangular cord switch 30 according to a second embodiment of the present invention may be used as shown in FIG. 7 and a semi-circular cord switch 32 according to a third embodiment of the present invention may be used as shown in FIG. 8.

Figure 9:
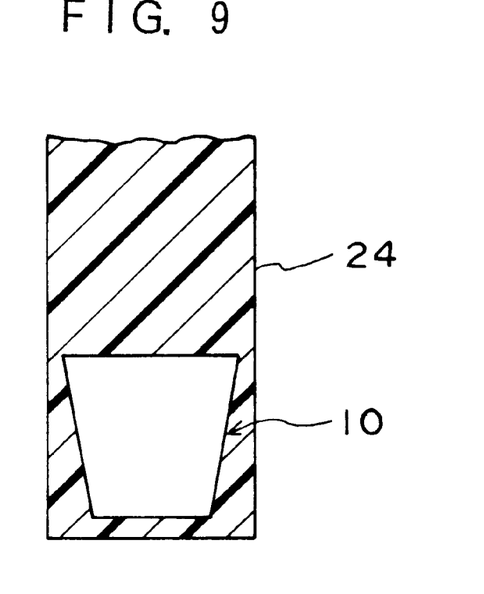
FIG. 9 is a partially transverse cross sectional view of a modified embodiment illustrating a state in which the cord switch according to the first embodiment of the present invention is mounted on a weather strip.
Figure 10:
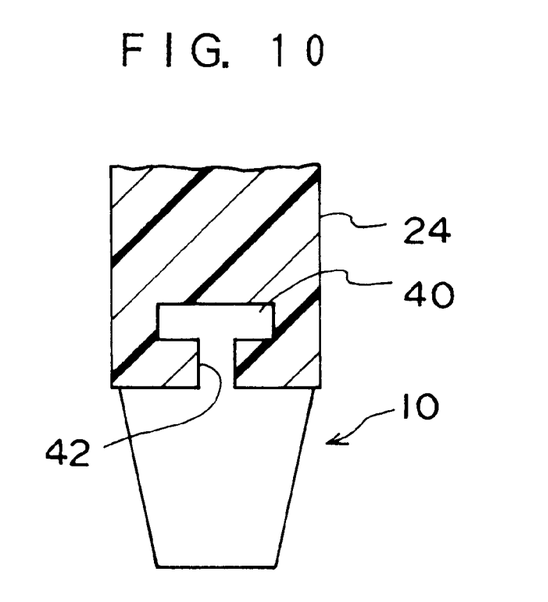
FIG. 10 is a partially transverse cross sectional view of another modified embodiment illustrating a state in which the cord switch according to the first embodiment of the present invention is mounted on the weather strip.
Figure 11:
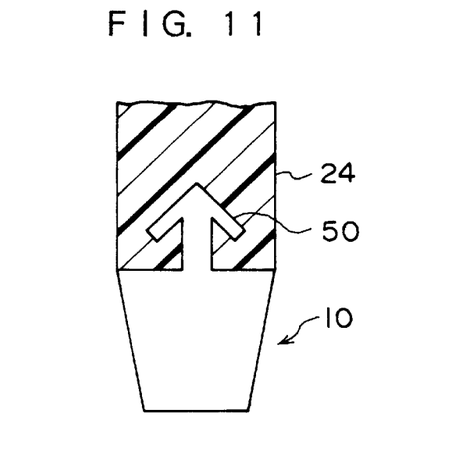
FIG. 11 is a partially transverse cross sectional view of a further modified embodiment illustrating a state in which the cord switch according to the first embodiment of the present invention is mounted on the weather strip.
Figure 12:
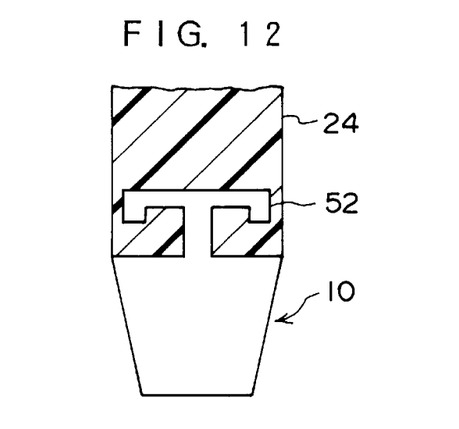
FIG. 12 is a partially transverse cross sectional view of an additional modified embodiment illustrating a state in which the cord switch according to the first embodiment of the present invention is mounted on the weather strip.
Figure 13:
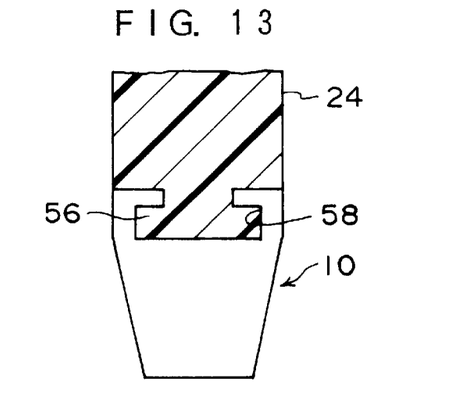
FIG. 13 is a partially transverse cross sectional view of another modified embodiment illustrating a state in which the cord switch according to the first embodiment of the present invention is mounted on the weather strip.

In accordance with the present embodiment, the cord switch 10 is adhered to the weather strip 24. However, as shown in FIG. 9, the cord switch 10 may be embedded in the weather strip 24. Further, as shown in FIG. 10, by forming a T-shaped projection (i.e., convex) 40 on the upper wall portion 12A of the cord member 12 and providing on the weather strip 24, a recessed portion (i.e., groove) 42 into which the T-shaped projection 40 is press-fitted, the mounting work of the cord switch 10 can be facilitated. The cross sectional configuration of a projection is not limited to a T-shaped configuration. Namely, an anchor-shaped (arrow-shaped) projection (i.e., convex) 50 which is shown in FIG. 11 or an umbrella-shaped projection (i.e., convex) 52 which is shown in FIG. 12 may be used, alternatively. Further, as shown in FIG. 13, a projecting portion or a convex 56 may be formed on the weather strip 24 and a recessed portion (i.e., groove) 58 into which the projecting portion or the convex 56 is press-fitted may be formed in the cord member 12.

Further, the present embodiment has been applied to a jam preventing apparatus used for the door glass of the vehicle. However, the present invention can be applied to a driverless or radio-controlled vehicle in which the cord switch is mounted on a bumper or the like of the vehicle in order to detect a collision of the vehicle. The present invention can also be applied to prevent any obstacle from being jammed in a so-called sunroof system in which a movable portion of a vehicle roof is automatically opened and closed and in an autodoor system of a 1-box-car type vehicle or the like. Thus, the present invention may be used for a jam preventing application or the like in which a cord switch is provided to be bent adjacent to a movable portion of a vehicle body to prevent any obstacle from being jammed around the movable portion of the vehicle body.

Since the cord switch according to the present invention has the above-described structure, the cord switch is more bendable than a conventional cord switch. Namely, the contact portion and the contact body are not made to contact each other even when the cord switch is bent, but they contact each other even when a pressing force which acts on the cord switch is small, and they contact each other regardless of the angle at which the cord switch is pressed.

What is claimed is:

1. A pressure-responsive switch, comprising:

a flexible hollow cord member formed of a tubular member of substantially constant wall thickness includes a predetermined wall portion and an opposing wall portion, which generally opposes said predetermined wall portion, wherein a neutral axis of said tubular member is located closer to the predetermined wall portion with respect to the center of a transverse cross section of the hollow cord member so that when pressure is applied to the switch, the neutral axis forms a border line between tensile force and compression force;

a contact portion which is disposed inwardly of said hollow cord member and extends on a portion of said predetermined wall portion in the longitudinal direction of said hollow cord member; and a contact body which is disposed apart from said contact portion and extends along the longitudinal direction of said hollow cord member, the contact body being disposed inwardly of said hollow cord member along said opposing wall portion and portions of said hollow cord member between said predetermined wall portion and said opposing wall portion in said hollow cord member, as viewed from the transverse cross section of said hollow cord member.

2. The switch according to claim 1, wherein at least one of said contact portion and said contact body is made of one of a conductive rubber and a conductive rubber in which a wire is embedded.

3. The switch according to claim 1, wherein one of said switch and a member on which said switch is mounted has a projecting portion and the other of said switch and the member has a recessed portion into which said projecting portion is press-fitted.

4. The switch according to claim 2, wherein one of said switch and a member on which said switch is mounted has a projecting portion and the other of said switch and the member has a recessed portion into which said projecting portion is press-fitted.

5. The switch according to claim 1, wherein said switch is mounted by one of adhesion, embedding and press-fitting on a member which is mounted along the inner periphery of a window frame for a window glass which can be raised and lowered.

6. The switch according to claim 2, wherein said switch is mounted by one of adhesion, embedding and press-fitting on a member which is mounted along the inner periphery of a window frame for a window glass which can be raised and lowered.

7. The switch according to claim 1, wherein said switch is mounted on a member via said predetermined wall portion.

8. The switch according to claim 1, wherein the transverse cross sectional configuration of said cord member is substantially trapezoidal and said predetermined wall portion is a wall portion which corresponds to a bottom side of the substantially trapezoidal configuration of said cord member.

9. The switch according to claim 1, wherein the transverse cross sectional configuration of said cord member is substantially triangular and said predetermined wall portion is a wall portion which corresponds to a side of the substantially triangular configuration of said cord member.

10. The switch according to claim 1, wherein the transverse cross sectional configuration of said cord member is substantially semi-circular and said predetermined wall portion is a wall portion which corresponds to a chord of said substantially semi-circular configuration of said cord member.

* * * * *